(No Model.)
W. SANDERS.
BALE BOX ATTACHMENT.
No. 452,287. Patented May 12, 1891.
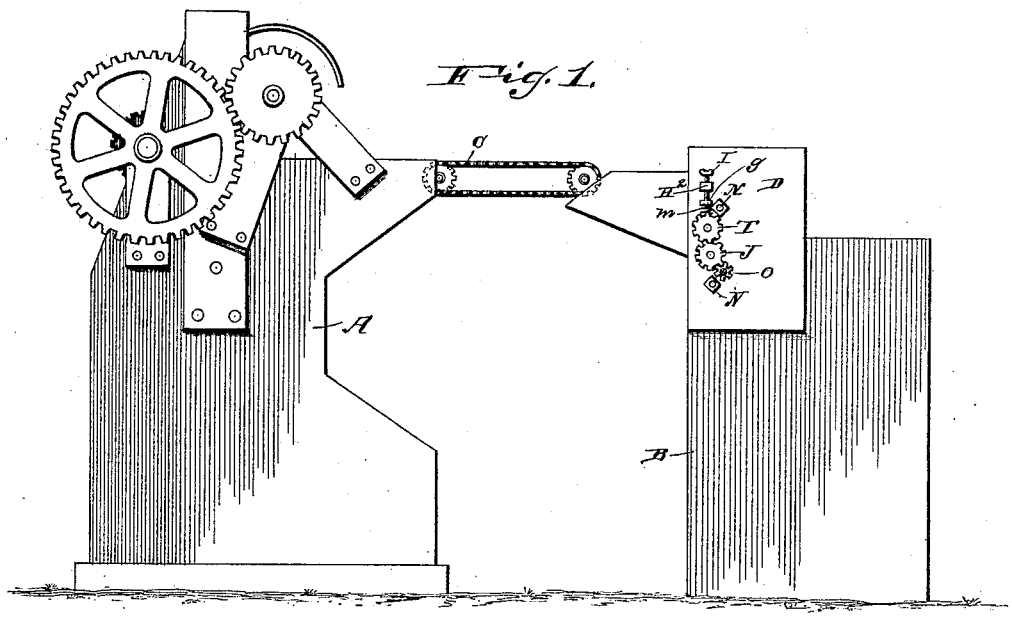
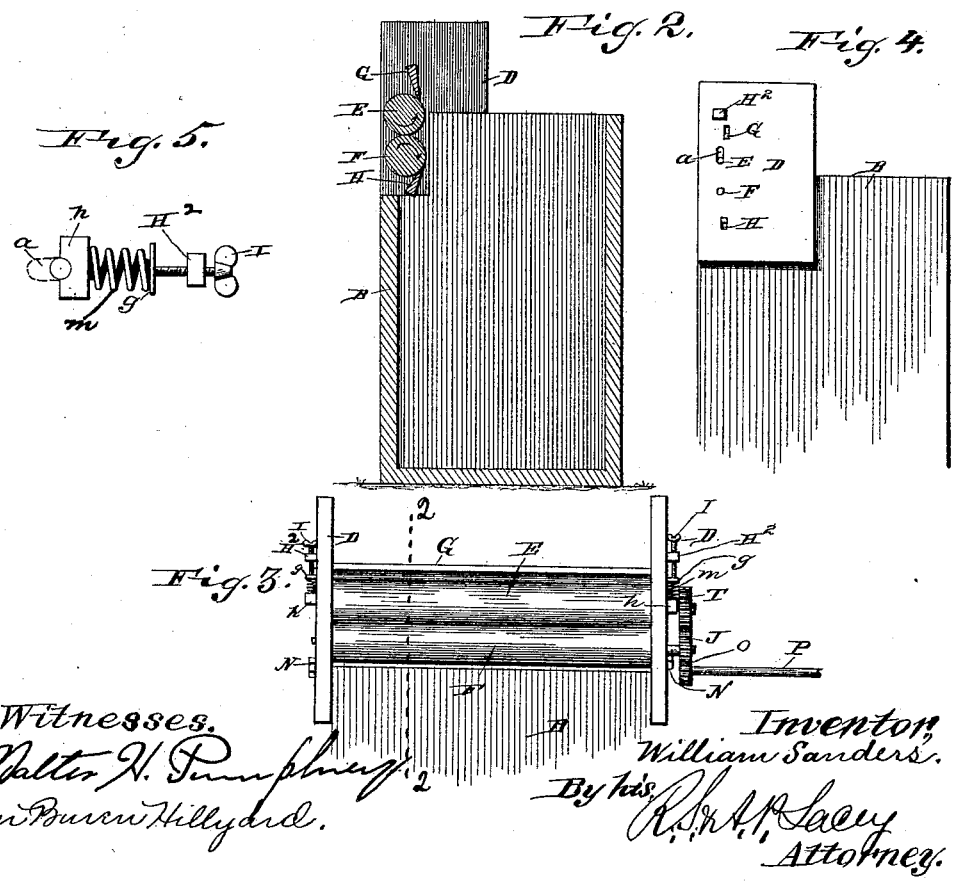

UNITED STATES PATENT OFFICE.

WILLIAM SANDERS, OF BIARD TOWN, TEXAS, ASSIGNOR OF ONE-HALF TO TRAVIS HENDERSON, OF SAME PLACE.

BALE-BOX ATTACHMENT.

SPECIFICATION forming part of Letters Patent No. 452,287, dated May 12, 1891.

Application filed August 9, 1889. Serial No. 320,289. (No model.)

*To all whom it may concern:*

Be it known that I, WILLIAM SANDERS, a citizen of the United States, residing at Biard Town, in the county of Lamar and State of Texas, have invented certain new and useful Improvements in Cotton-Presses; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an attachment for cotton-presses.

The object of the invention is to save the handling of cotton and the labor and cost generally employed to transfer the cotton from the gin to the press and pack the same in the baling-box.

The improvement comprises two presser-rollers between which the cotton as it comes from the gin, is compressed, yielding bearings for one of the said presser-rollers, two guard-bars, one for each presser-roller, to prevent the cotton being carried out by the rollers, the ends of the guard-bars being threaded to receive nuts by means of which the attachment is clamped to the baling-box, and a conveyer to transfer the cotton from the gin to the said rollers.

The improvement further consists of the novel features which will hereinafter be more fully described and claimed, and which are shown in the annexed drawings, in which—

Figure 1 is a side view of the attachment, showing its application to a cotton-gin. Fig. 2 is a cross-section on the line 2 2 of Fig. 3. Fig. 3 is a front view of the attachment. Fig. 4 is a side view of the same, the gear-wheels and the nuts on the ends of the scraper-bars being removed. Fig. 5 is a detail view of the yielding bearing for the movable roller and the means for adjusting the tension of the spring which supports the bearing against the pressure of the roller.

The gin A and the baling-box B are of well-known construction. The conveyer C between the gin and the baling-box is preferably an endless conveyer which automatically transports the cotton from the gin to the baling-box.

The attachment for the baling-box comprises the end plates D, the presser-rollers E and F, and the scraper or guard-bars G and H. One of the rollers is mounted in adjustable bearings and is held against the other roller by a yielding pressure, so as to adapt itself to the bulk of cotton passing between the rollers. The roller that is adjustable is E, and its journals extend through slots $a$ in the end plates, and springs or rubber blocks $m$ are placed between the bearings $h$ and the plates $g$, which bear against the set-screws I, that pass through the lugs $H^2$, the tension of the springs $m$ being adjusted by the set-screws I. The rollers are geared to revolve together, preferably by the gear-wheels T and J, which are mounted on the ends of the journals of said rollers, motion being imparted to the roller F by the pinion O on the line-shafting P, gearing into the cog-wheel J. The ends of the scraper or guard-bars are threaded, and the nuts N on said threaded ends serve to hold the said bars in place and clamp the end plates D to the sides of the baling-box. The guard-bars are about in line with the inner side of the baling-box.

The operation of the invention is as follows: The cotton from the gin is conveyed to the presser-rollers, between which it is compressed and forced into the baling-box below the plunger or follower. (Not shown.) When a sufficient quantity of cotton to make a bale has been delivered and packed into the baling-box, the cotton is pressed to form a bale in the usual manner.

Having thus described my invention, what I claim, and desire to secure by Letters Patent, is—

The combination, with the baling-box, of the plates D D, the presser-rollers E and F, journaled at their ends in the said plates and geared to revolve together, the guard-bars, one for each roller, having their ends threaded and thrust through the plates D D, and nuts on the said threaded ends of the guard-bars to clamp the plates on the baling-box and hold the guard-bars in place, substantially as described.

In testimony whereof I affix my signature in presence of two witnesses.

WILLIAM SANDERS.

Witnesses:
GAY HENDRICKS,
S. P. HENDRICKS.